United States Patent [19]

Benckhuijsen

[11] Patent Number: 4,834,079
[45] Date of Patent: May 30, 1989

[54] PROTECTIVE COVER FOR LEGS & JOINTS OF HOOFED ANIMALS

[75] Inventor: Jan-Gerrit Benckhuijsen, Liechtenstein, Netherlands

[73] Assignee: Temova Establissement, Liechtenstein, Liechtenstein

[21] Appl. No.: 99,694

[22] Filed: Sep. 18, 1987

Related U.S. Application Data

[63] Continuation-in-part of Ser. No. 911,093, Sep. 24, 1986, abandoned, which is a continuation of Ser. No. 639,519, Aug. 7, 1984, abandoned, which is a continuation of Ser. No. 354,437, Mar. 3, 1982, abandoned.

[30] Foreign Application Priority Data

Mar. 9, 1981 [CH] Switzerland .................. 1638/81
Jun. 22, 1981 [CH] Switzerland .................. 4106/81

[51] Int. Cl.$^4$ .............................................. A21F 13/00
[52] U.S. Cl. ...................... 128/82.1; 128/379; 128/384; 54/82
[58] Field of Search ............. 54/82; 2/22; 128/82.1, 128/165, 362, 37.9, 382, 402, DIG. 15, 783

[56] References Cited

U.S. PATENT DOCUMENTS

| | | | |
|---|---|---|---|
| 1,101,759 | 6/1914 | Salter et al. ........................... | 54/82 |
| 1,945,226 | 1/1934 | Lutsche ................................. | 54/82 |
| 2,194,921 | 3/1946 | Wagner, Jr. ........................... | 54/82 |
| 2,937,487 | 5/1960 | Dever .................................... | 54/82 |
| 3,209,517 | 10/1965 | Hyman ................................. | 54/82 |
| 3,256,882 | 6/1966 | Huber .................................... | 128/165 |
| 3,509,672 | 4/1970 | Moon .................................... | 128/165 |
| 3,822,705 | 7/1974 | Pilolte .................................... | 128/379 |
| 3,822,807 | 5/1975 | Moran ................................... | 128/402 |
| 3,913,302 | 10/1975 | Centers ................................. | 54/82 |
| 4,092,982 | 6/1978 | Salem ................................... | 128/82.1 |
| 4,140,116 | 2/1979 | Hampicke ............................. | 128/165 |
| 4,336,867 | 6/1982 | Benckhuigser ....................... | 54/82 |
| 4,342,185 | 8/1982 | Pellow .................................. | 54/82 |
| 4,671,049 | 6/1987 | Benekhuigsen ....................... | 128/379 |

FOREIGN PATENT DOCUMENTS

| | | | |
|---|---|---|---|
| 0019822 | 12/1980 | European Pat. Off. ............ | 128/379 |
| 0029739 | 6/1981 | European Pat. Off. . | |
| 0059917 | 11/1984 | European Pat. Off. . | |
| 7807150 | 3/1978 | Fed. Rep. of Germany . | |
| 2718807 | 12/1978 | Fed. Rep. of Germany ........ | 54/82 |

OTHER PUBLICATIONS

Arnim et al., "Nie Therapie Degenerativer Wirbel Saulen und Geleuk ser krankungen mit neuen Vibrostatic Bandage", *Therapie Woche,* Jul. 31, 1981, 6 pages.
Harris, DVM "Summary of Clinical Tests of Vibrostatic Bandages", 1982–1983, 22 pages.
Harris, DVM, "The Stimulation of Healing by Vibrostatic Bandages", *Equine Practice,* vol. 5, No. 10, Nov.–Dec. 1983, pp. 10–14.
Schmidt et al., "Rumpforthesen in dev Therapie des Lumbal Sydroms", *Medizinisch—Orthopodische Technik,* Jan.—Feb. 1981, 6 pages.
Arnim, "Medizinasche Bandager", Jun. 27, 1978.
Temova, "Medizinishe Bandager", 4 pages.

*Primary Examiner*—Edward M. Coven
*Assistant Examiner*—K. M. Reichle
*Attorney, Agent, or Firm*—Cushman, Darby & Cushman

[57] ABSTRACT

The protective cover differs from known bandages and puttees by the fact that it has a therapeutic effect. The therapeutic effect results from the type and structure of the textile fabric which completely encloses the padding of the cover, as well as from the nature of the padding. The textile fabric consists of an electrostatically active synthetic fiber knit generating high electostatic voltages on the skin. A fine rib-knit made of, e.g. polyvinyl chloride fibers with 50–120 stitches/cm$^2$ proved to be therapeutically effective. By an appropriate size of the mesh and the use of a synthetic foam with open pores the evaporation of the skin moisture arising when the protective cover is worn is made possible and thus the high electrostatic voltages are maintained. The protective cover is designed to cure existing leg ailments of hoofed animals and to prevent them.

11 Claims, 5 Drawing Sheets

PROTECTIVE COVER FOR LEGS & JOINTS OF HOOFED ANIMALS

This is a continuation-in-part of application Ser. No. 911,903, filed Sept. 24, 1986, which is a continuation of Ser. No. 639,519, filed Aug. 7, 1984, which is a continuation of 354,437, filed Mar. 3, 1982, all of which were abandoned upon the filing hereof.

This invention relates to a cuff-like protective cover for the legs and joints of hoofed animals, in particular of horses, with webbing to attach said protective cover to the said animals.

Bandages and puttees foreseen for horses' legs are intended as a protection against external injuries of the legs. Besides, bandages are used to apply dressings and wraps. Bandages consist of strips of linen or wool webbing, 6-8 cm wide, which may be applied from the carpal joint or from the hock downward, covering the entire fetlock all the way to the coronets. The utility of such bandages, however, depends to a large degree on expert bandaging and they are of no therapeutic value as such. Besides, constriction and impaired blood circulation are almost unavoidable. As an alternative to bandages, there are the buckled puttees which do not offer any therapeutic effects per se, and which are less efficient in holding wraps, but which are applied much faster and do not impair blood circulation. Buckled puttees made of leather, woolen cloth or synthetic materials provide a one-layered cover around the corresponding part of the leg and are held together by belts and buckles. The use of such puttees is limited to the lower legs between the coronets and the lower root of the carpal joint or the hock.

The present invention has the purpose of providing a protective cover for the legs of hoofed animals, in particular of horses, to be applied around the corresponding part of the leg in the manner of a puttee, but which in addition to the protective function against external injuries has also therapeutic effects on the parts of the front and hind legs extending between the coronets and up to and covering the carpal joint and the hock, respectively.

These objectives are achieved by the present invention, namely by a protective cover of the type stated above, characterized by a design of the protective cover as a therapeutic means to treat ailments of the enclosed areas by means of electrostatic charges generated on the skin, by the fact that the protective cover may be applied around the legs and the joints and after that keeps its shape, that it consists of an inner and an outer layer, each of the same knit textile material, with a synthetic foam pad between the two layers, by a textile material suitable for generating static electricity, made of nonhygroscopic fibers of a synthetic material, with 50 to 125 stitches per s.cm. (cm$^2$).

by a synthetic foam pad with open and permeable-to-air pores bonded to the inner and outer layers, acting as a cushion.

The special denominations used in the description hereinafter, are taken from the book "Der Reiterpass", by H. D. Donner and M. Llewellyn, Jahr-Verlag KG, Hamburg.

Hereinafter, the invention shall be explained in detail with the aid of the enclosed drawings. The drawings show:

FIGS. 2a & b top view of the simplified drawing of the inner layer (FIG. 2b) and of the outer layer (FIG. 2a, folded upward) of a foot cover for the front leg;

FIG. 3 a section along the line A—A of FIG. 2a;

FIGS. 4a+b a section according to FIG. 3 for another design of the protective cover according to FIG. 2a;

FIGS. 5a+b Top view of the simplified drawing of the outer layer (FIG. 5a) and the inner layer (FIG. 5b) of a joint-cover for the carpal joint;

FIG. 6 A simplified outline of the joint-sleeve of FIG. 5, seen in the direction of B of FIG. 5a;

FIG. 7 a top view of the basic material used to manufacture the padding of the joint-sleeves of FIGS. 5 and 6, respectively;

Figures 1A, 1B, 1C, 1D, 1E:
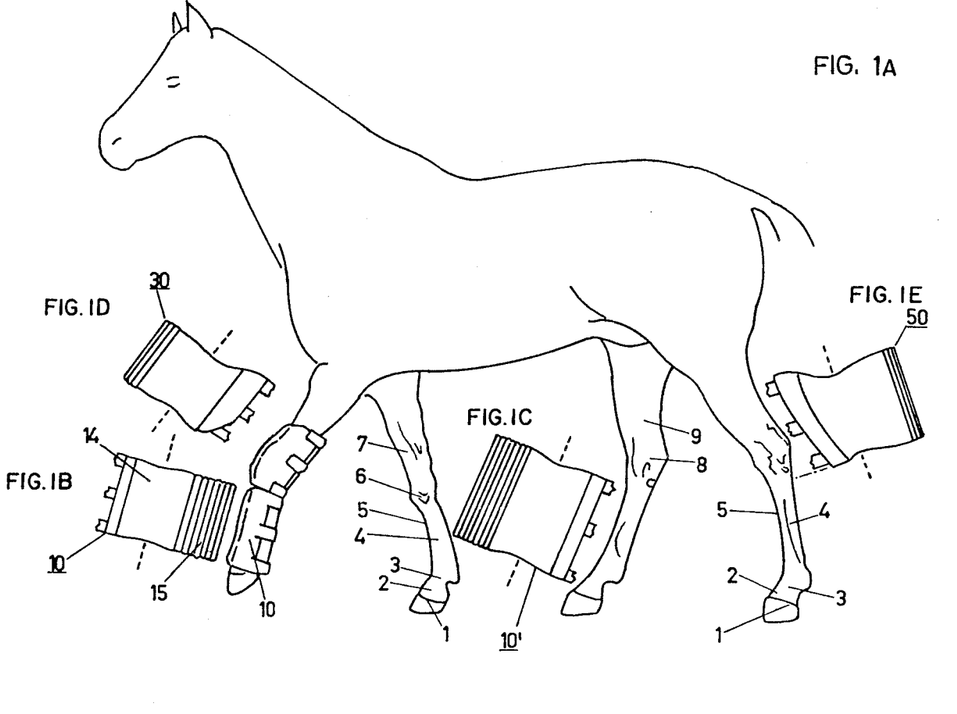
FIGS. 1A-E four different designs of protective covers, in a simplified drawing, with the corresponding areas of the legs.

With reference to FIG. 1 we wish to put forth some details and denominations of horses legs. On both the fore and hind legs, there are the coronets 1, the pastern 2, the fetlock joint with fetlock 3, and the metatarsus 4 with front cannon bone 5. In addition, the foreleg has the carpal joint 6 and the forearm 7, the hind leg has the hock (talocalcanean) 8 and the gaskin 9. Since this anatomy is common to both the solid ungulate and the perissodactyl family, the protective cover of this invention is also suitable for a number of other animals besides horses, in particular for zoo animals.

The protective covers to the purposes of this invention are primarily the four designs schematically drawn in FIG. 1. In particular, the drawing shows the area of leg to be covered by each design. Footcover 10 shown applied and spread is intended for enclosing the entire metatarsus, as well as the fetlock joint 3 and the pastern of the foreleg. In a corresponding manner, foot-cover 10' encloses the metatarsus 4, the fetlock joint and the pastern 2 of the hind leg. As shown, the foot-covers 10 and 10' for the fore and hind legs only differ in their sizes. Then there are two joint-sleeves 30 and 50 planned for the carpal joint 6 and the hock 8. Joint-sleeve 30 will enclose the whole area of the carpal joint 6, reaching from the lower rim of the joint all the way up to the forearm area 7 of the foreleg. On the other hand, the joint-sleeve 50 will reach from below the hock 8 to the area of the gaskin 9, enclosing the whole hock 8. FIG. 1 shows the insides of the covers 10,10', 30, 50 spread open, the broken lines indicating the direction of the axis of the respective leg sections once the sleeve has been applied correctly. For reasons to be explained below, the covers will be appropriately fastened if the cannon bones and/or the front edges of the carpal joint and the hock (6,8) touch the insides of the covers parallel to the broken lines.

As is evident from the design for the foot-cover 10, according to FIGS. 2, 3, the foot-cover 10 as well as foot-cover 10' of the hind leg (indicated by a broken outline) are of rectangular shape, and due to their identical design, the comment hereinafter will apply to both analogously. The height h corresponds to the distance from pastern to carpal joint 6, whereas the slightly larger width b is in excess of the circumference at the fetlock 3. According to FIG. 3, the foot-cover 10 has a padding 13 running between the outer layer 11 and the inner layer 12 throughout the cover. Due to its excess width, the foot-cover is adaptable to feet of different thickness and correspondingly divided into an area of contact 14 and a roll-up area 15. The roll-up area 15 has a structure made up of parallel round wads for fully fashioned roll-up. As is evident from FIG. 3, the outer layer 11 and the inner layer 12 consist of a textile fabric 17 which encloses the large faces, the longitudinal and transversal edges of the padding 13.

When rolled up on the foot, the cover 10 is fastened by self-adhesive stick-and-tear fasteners. They consist of sticking and adhesive tapes 20 running across the outer layer 11 in the area of contact 14 and complementary tapes 21 protruding over the lateral edge 18 of the area of contact 14, and also attached across the outer layer 11. Another pair of stick-and-tear fasteners consists of a strip of sticking and adhesive tape 22 running along the side edge 18 on the inside 12 and a counterpart 23 of complementary material which covers the roll-up area 15 on the outside 11.

When rolled up, the area of contact 14 will overlay the roll-up area 15 with its side edge 18, with strip 22 and its counterpart 23 touching and providing a first means of closure. Furthermore, the tapes 21 protruding beyond the side edge 18 are run around the roll-up area 15 and, in combination with the transversal webbing 20, they provide another fastening means, thereby guaranteeing a steady fit. It is evident that once the cover is rolled up, the inner lining consists wholly of the aforementioned textile fabric 17 in contact with the skin throughout. The preferred application is to have the surface of the area of contact 14 running along the center of the cannon bone area. In this position, the webbing 21 ends on the lateral side of the foot (FIG. 1) and is thus strip-proof.

As illustrated by the covers 10,30 (FIG. 1) applied to the left foreleg, these covers 10,30 provide a traditional protection against external injuries, with the area of protection reaching from above the carpal joint 6 to the coronet 1. It is an essential feature of this invention that the covers 10,10',30,50 are further designed as a therapeutic treatment for leg ailments, thus achieving a healing effect besides the protective function of the covers. The achievement of this therapeutic effect by the foot-cover 10 depends essentially on the material and the structure of the textile fabric 17, on the structure of the padding 13, as well as on the mutual positioning of textile 17 and padding 13 with regard to the focus of the ailment.

Human medicine knows of synthetic fiber fabrics suitable to generate static electricity, causing an electrostatic charge on the skin and thereby a feeling of warmth, and this is the reason why such textiles are used for health underwear.

If the protective cover 10, as described above, is furnished with a textile fabric 17 of a certain structure and then applied to a horse suffering from tendovaginitis, the symptoms surprisingly disappear within a very short period of time. Obviously, this healing effect cannot be attributed only to the heat generated in the surrounding area of the focus. Rather, it has to be assumed that the electrostatic charges on the skin, as well as the electrostatic tension, are beneficial for the healing. Possibly, such textile fabrics may cause novel healing effects on horses which had not been known up to now. It has also been established that the textile fabric 17 does not cause the healing by itself, but only in combination with a suitable padding 13, and further, that it is especially effective if not only the inner layer 12 but as well the outer layer 11 consists of said textile fabric 17.

The aforementioned textile fabric 17 is a synthetic fiber knit for which paraffined polyvinyl chloride fibers of the THERMOVYL brand have proved to be suitable, with a 10–15% acrylic fibers added for increased tear resistance, if desired. But other synthetic fibers suited for generating static electricity may also be used to manufacture the knit fabric 17. For therapeutic purposes it is essential that the charge on the skin and the electrostatic tension produced maintain the highest possible value. Consequently, the fabric concerned should be very dense in order to achieve high electrostatic readings and on the other hand the mesh openings should be large enough to permit easy evaporation of the skin moisture which may appear due to the heat generation and which might impair the electrostatic charge. It has been determined that these requirements are best met by fine ribbed knits and interlock knits of the following specifications: The fine ribbed knit was manufactured from the above-named synthetic fiber of 2,5 to 4 den. on a STIBBE circular knitting machine, with 10 needles on 2 cm. The number of stitches was 21 stitches on 2 cm in length and 15 stitches/2 cm width, the number of openings 78/cm$^2$ and the weight 315 g/m$^2$. In general, the most effective number of stitches was in the area of 18–25 or 12–20 per 2 cm in length or width, respectively, and 310–325 g/cm$^2$ as the preferred range of weight for the fine ribbed knit. Other circular knitting machines or straight knitting machines may also be used. On an interlock basis and taking 16 needles per 2 cm of interlock knit the most effective specifications for the purpose of our application are: Weight of yarn: 40000–50000 m length/kg, 20–30 stitches/2 cm in length and width, basis weight 150–300 g/m$^2$. Typical data for a 40000 m/kg yarn, for instance: 26(25) stitches on 2 cm of length (width) and 260 g/m$^2$ weight; for a 50000 m/kg yarn: 25(24) stitches on 2 cm length (width) and 200 g/m$^2$ weight. In FIG. 2a, for instance, the textile fabric 17 has been represented schematically, with horizontal lines for fine ribbed knit and latticed for interlock.

As mentioned before, in addition to textile fabric 17, a specific make-up of the padding 13 is necessary for the foot-cover 10 to have a therapeutic effectiveness. The main specification is that the padding 13 must let the air pass unhindered. This permeability to air is needed to let the moisture evaporated by the skin pass through the foot-cover 10 from the inner layer 12 to the outer layer 11. The padding further has to have a certain elastic rigidity to assure uniform contact pressure of the textile fabric 17 against the skin. As a rule, these requirements are met by a foam of the polyurethane foam family for the padding 13, since its open pores let the air pass, it has the desired rigidity and lets the humidity get through. The foam of the foot-cover tested in practice, for instance, is 2 cm thick and weighs 40 kg/m$^3$.

The outer layer also has to be permeable to air, of course. But practical experience has shown that the therapeutic effectiveness of the foot-cover 10 is increased if textile fabric 17, according to the above specifications is used for an outer layer 11 of the foot-cover, and not just any porous material such as linen, for instance. It is further beneficial if two mutually movable layers of the textile fabric 17 completely enclose the padding 13. The electrostatic tensions produced against the skin are in excess of 30 kV.

To manufacture the foot-covers 10 and 10', it is advisable to follow these steps: Bond single or double-layered textile covers on the locking machine, introduce the foam through one side left open and sew up; sew on stick-and-tear fasteners 20-23 with a leather-sewing machine. In FIG. 2, for instance, sewn in seams 26 and sewn on seams 27 are indicated by broken lines.

Figures 2A, 2B, 3, 4A, 4B:
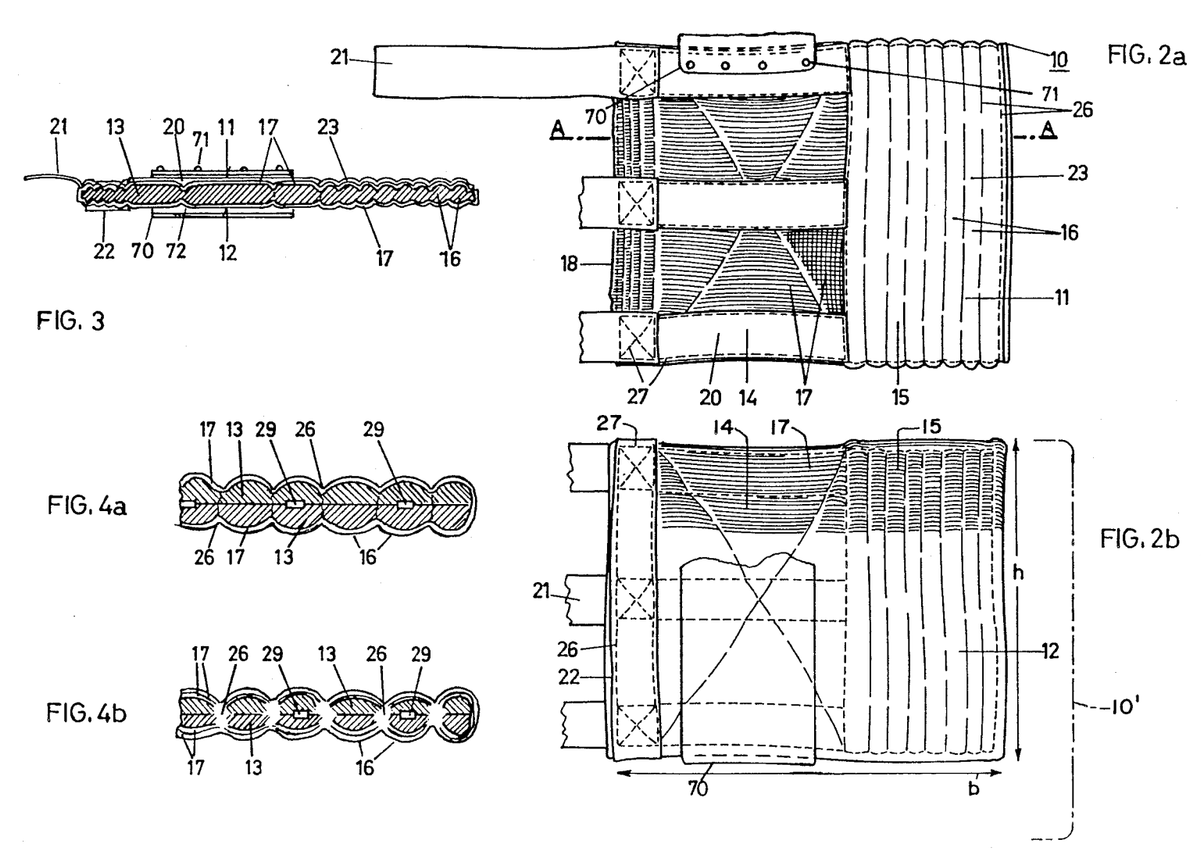

As is evident from FIGS. 1-3, manufacturing the protective covers under review e.g. from a double layer of the above-named type of fabric for the outer layer 11 and the inner layer 12, as well as the foam padding, attaching the stick-and-tear fasteners call for a great number of seams, that is a considerable amount of work. It has now become possible to reduce work by the surprising discovery that a textile fabric of the above characteristics may also be joined by a process known in the leather processing industry, called high-frequency welding. Instead of sewing, the two materials to be joined are pressed between two wedge-like metal electrodes and welded together by high-frequency energy. However, to proceed with this method, it is indispensable that not only the weldable textile fabric be used to produce the protective cover, but also a suitable foam which on the one hand has to offer the structural characteristics mentioned above, and be fit for high-frequency welding. Up to now, the polyurethane padding 13 mentioned above has caused some difficulties, and we therefore use a polyvinyl chloride foam for this purpose; it is marketed under the brand name TROVIPOR and has the necessary rigidity, open pores and sufficient air permeability. This TROVIPOR foam may be welded by high-frequency and can therefore be processed with the above-mentioned textile fabric. A frequency range of approx. 20 MHz has proved appropriate for this purpose, the same as that used on the well-known high-frequency welding machines of the leather industry. To produce the above-mentioned protective cover by this high-frequency welding process, the single or double layered textile fabric of the inner layer is placed on the lower electrode of the welding machine in question, the foam plate of about 10-20 mm thickness placed on it, and the single or double-layered textile web 17 of the outer layer placed on top, all three precut to the desired shape, as per FIG. 2. Along the lines to be welded, that is, where so far the seams 26, 27, had been sewn, at least one of the electrodes—possibly the upper one—has ribbed bars with wedge-like edges, which clamp the various layers of the protective cover into place when the electrodes are pressed together. A short burst of high frequency energy melts the materials of the textile fabric 17 and of the padding 13 along the clamped lines, and they are permanently bonded along this welding. It is also possible to apply the adhesive tapes 20 or webbing 21 by this high-frequency welding process to the outer layer, whereby they would not necessarily have to be made of a material fit for high-frequency welding but could be sewn onto a backing fit for welding; this backing would then be welded to the textile fabric on the outside of the protective cover, a step that could be organized to coincide with the welding of the other parts of the protective cover.

For the foot-covers shown in FIGS. 2 and 3, designed for the foreleg, practice has proved that it may be convenient to reinforce the structure made of parallel round wads 16 in the roll-up area 15 by elastic bars 29 introduced into the round wads, as indicated in FIG. 2a. In one of the preferred designs—as indicated in the cross-section of FIG. 4a,—the foam padding 13 consists of two thin webs of foam with elastic bars 29 placed at the points where the round wads 16 are foreseen. Once the round wads have been made by applying the continuous seams 26, the bars 29 are sufficiently fixed within individual round wads 16; if desired, the bars 29 may also be glued or otherwise fastened to one or both foam webs. If for the design according to FIG. 4a the round wads are not achieved by a seam but by the high-frequency method described above, then a more or less homogenous zone of melted PVC material is created between neighbouring round wads along the welding seams 26—as indicated in FIG. 4b, and this also guarantees that the bars 29 placed along the center axis of the round wads are practically immovable.

In the foot-covers 10 for the foreleg and the corresponding foot covers 10' for the hind leg, as shown in FIGS. 2a, 2b, it is convenient to have the lower edge facing the coronet reinforced by a bordering of a more durable material, for instance of leather. This bordering may be sewn to the protective cover later on and assures longer wear for this edge. If a tough polyvinyl chloride material is used instead of leather, for instance the imitation leather known as SKAI, it is possible to weld this protective bordering onto the protective cover by the high-frequency welding method described above, or to include it in the manufacturing process. Naturally, the upper edge of the protective covers 10 and 10' may also be protected by such a reinforcement.

The designs of the joint-sleeves 30,50 according to FIGS. 5-8 for the carpal joint 6 or the hock 8, each have a textile lining and padding of identical material make-up as the textile fabric 17 and the padding 13 of the foot-cover 10, wherefore we abstain from repetitive statements concerning their characteristics and purposes.

Figures 5A, 5B, 6, 7:
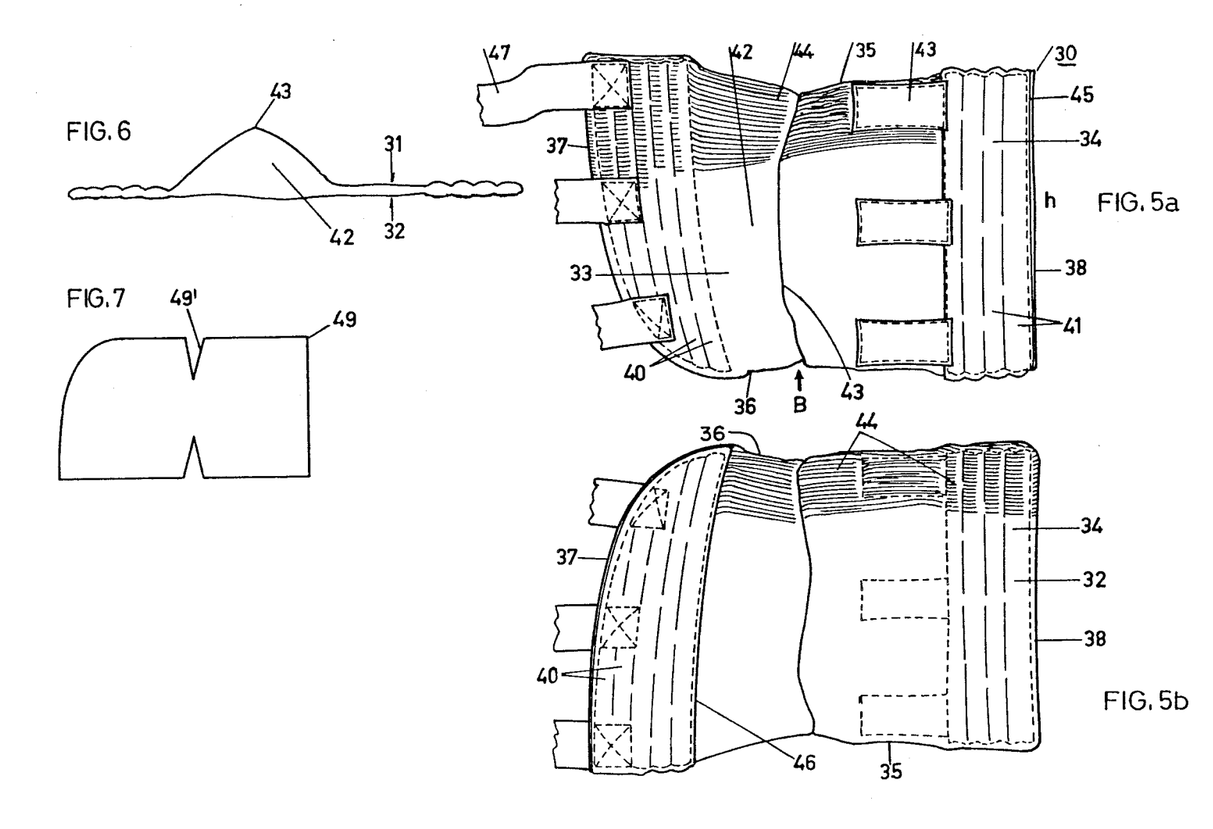

The joint-sleeve for the carpal joint 6 has an outer side 31 and an inner side 32, as is evident from FIGS. 5a and 5b. The height h of the joint-sleeve 30 is conveniently slightly larger than the distance between the lower and the upper root of the carpal joint 6. Similarly, the upper and the lower widths are also slightly larger than the circumference of the carpal joint, whereby the sleeve 30 is divided into an area of contact 33 and a roll-up area 34. When applied to the leg, the sleeve 30 encloses with its wider upper edge 35 the forearm 7 and with its shorter lower edge 36 the metatarsus 4, with the roll-up area 34 lying under the lateral edge of the area of contact 33. This lateral edge 37 is rounded from the upper edge 35 towards the lower edge 36, with the lateral rim of the roll-up area 34 running at a right angle to the edges 35,36. On both sides of the lateral edges there are round wads 40,41 turned inward. In the area of contact 33, a bulge 42 is rising towards the outside, rising at an angle from the upper and lower edges 35,36 forming a roof-like ridge 43 in the center to lower area of contact 33. Seen in the direction of B, FIG. 5a, the approximate height of the bulge 42 is visible in the cover outline according to FIG. 6. The cover 30 shown here is designed for the left joint 6, the corresponding sleeve for the right joint is of mirror-symmetrical shape. In general, sleeve 30 with the present shape is appropriate for that left or right carpal joint 6 on which the roll-up area 34 happens to lie across.

On its outer 31 and inner sides 32 and along the edges 35–38, the joint-sleeve 30 is covered by a—preferably double layer—of fabric 44 of the above characteristics, and it has the foam padding indicated above. The self-adhesive sticking closures consist of the adhesive tape 45 covering the roll-up area 34 on the outside 31 and its counterpart 46 which runs along the rounded side edge 37 of the area of contact 33, on the inside 32. The tapes 47 sewn onto the outside 31 and protruding beyond the rounded side edge 37 are coordinated with the transversal adhesive tapes 48 on the outside 31.

To manufacture the joint-sleeve 30 we found that the use of a foam 49 plate 2 cm thick and cut to the shape indicated in FIG. 7 was appropriate. First, the two notches 49' are interlocked to produce the desired bulge 42 in the foam 49. The subsequent manufacturing steps correspond to the steps described to manufacture the foot-cover 10.

Figure 8A:
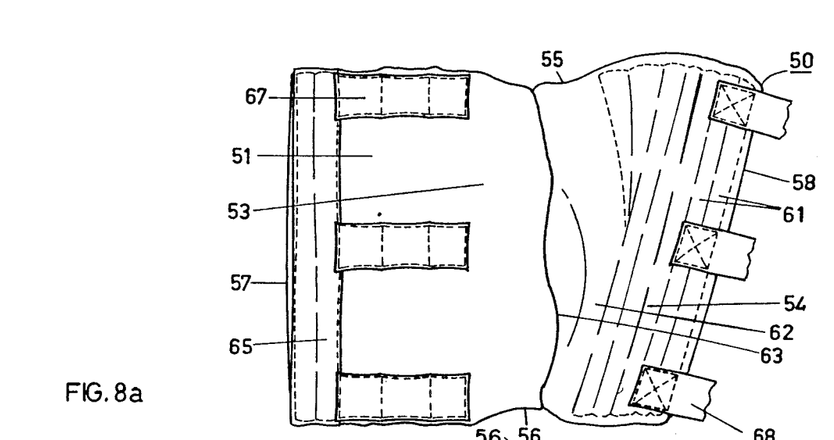
FIGS. 8a+b Top views of the outer layer (FIG. 8a) and the inner layer (FIG. 8b) of a joint-sleeve for the hock, in a simplified drawing.
Figure 8B:
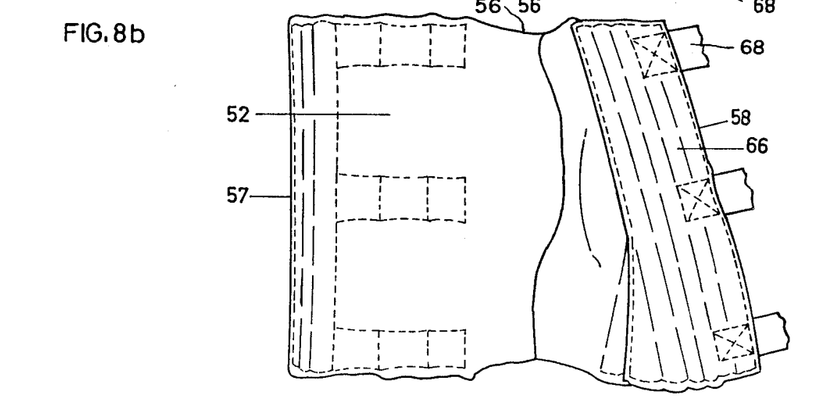

The joint-sleeve 50 according to FIG. 8 for the hock 8 has basically the same shape as the joint-sleeve 30. The difference is due to the backward angle of the hock 8, thus the above explanations concerning joint-sleeve 30 are analogously applicable to the joint-sleeve 50. The joint-sleeve 50 has an outside 51, an inside 52, the area of contact 53, roll-up area 54, the wider upper edge 55 and the narrower lower edge 56, side edge 57 of the area of contact 53, standing vertically between the upper 56 and lower 56 edges, as well as the side edge of the roll-up area 54, which slopes towards the lower edge 56. The roll-up area 54 is structured by parallel round wads 61. The bulge of the area of contact 53 is more pronounced than the bulge 42 of the joint-sleeve 30 and has a roof-like to rounded ridge 63. When applied to the horse, the roll-up area 54 is on the inside of joint 8; thus the sleeve 50 shown here is intended for the left hock. The roll-up area 54 overlays the area of contact 53 at its side edge 57. The strip 65 on the outside 51 is stuck to the counterpart 66 on the inside; the adhesive tapes 67 fasten the tapes 58 protruding beyond the side edge 58 of the roll-up area.

We wish to point out that instead of or in addition to the self-adhesive stick-and-tear closures of the covers 10,10',30,50, there may also be belt-and-buckle closures. The joint-sleeve 50 is completely covered by the textile fabric mentioned above, the same as the joint-sleeve 30, and it has the foam padding 49.

The same therapeutic effects as those ascertained on the foot-covers 10, 10' can be proved for the joint-sleeves 30,50 of the present shape and type of material, and they are well suited for the treatment of ailments in the areas of the carpal joint and the hock. As mentioned above, it is important that the outside of the above-mentioned protective covers be also made of the textile fabric 17.

As described above for the foot-covers 10 and 10', it may be advisable to have certain parts of the outside or the edges of the joint-sleeves 30 and 50 reinforced by leather or some similar, strong material, to avoid damages due to wear. If desired, the edge 38 on the joint-sleeve 30 according to FIGS. 5a and 5b may also be rounded instead of running straight to achieve a better fit.

The joint-sleeves 30 and 50 described above have a number of seams and may, with appropriately designed electrodes, be manufactured by the method of high-frequency welding along these seams, using, of course, a foam padding that is fit to be welded along the seams by the same process, as described above (page 11).

In the treatment of ailments of the above type in horses by means of the present therapeutic protective covers, it has been found that it is convenient to apply a cold wrapping on the diseased areas of the legs immediately before applying the covers. To make such a previous cold treatment easier, a pocket 70 may be included in the protective covers described above, such as indicated for the foot-cover 10 in FIGS. 2a, 2b and 3, the pocket running along the inside 12 of the foot-cover. It may consist of a thin plastic film folded around the lower rim of the foot-cover 10 and fastened on the outside 11 by snap fasteners 71 for easy removal. A flexible, completely impermeable cushion filled with cold water, ice or some other cooling agent may be introduced into this pocket 72 formed by the plastic web 70. As such a cold treatment should never last long, the cushion with the cooling agent can be removed from this inner pocket 72 and the plastic web 70 is pulled out of the foot-cover 10 and detached from it. Thus, the therapeutic electrostatic heat treatment by the foot-cover 10 is initiated immediately after the cold treatment, something that has proved to be especially effective.

The protective covers 10, and 30, and 50, for therapeutic purposes, as described in FIGS. 2–8, have been tested by two specialist veterinaries, but their construction and the materials used were kept confidential throughout. The protective covers were called VIBROSTATIC bandages, in accordance with the applicant's registered trademark VIBROSTATIC. The examples I and II given hereinafter correspond to the opinions based on the above-named two tests.

Example I (Dr. G. G., veterinarian for horses, Kronberg/FGR)

"We tested the VIBROSTATIC heat bandages on 12 horses from Jan. 21, 1980 to Feb. 28, 1980.

We had no problem applying the bandages to all the horses, and they were tolerated well even during prolonged wear. Only one horse had to be given additional protection to stop it from gnawing the bandages.

In the area of the front extremities we applied the bandages between the hoof and the carpal joint and on the hind legs between the hoof and the hock.

We saw the best success with acute hemarthrosis and tendovaginitis due to a distortion or overexertion. In these cases, application of the bandages led to subsiding of the symptoms without any additional medication and in a minimum of time.

With pathological processes of longer duration (carpitis after a chip fracture, tendovaginal gall) a stimulant of the blood flow was rubbed in additionally. In these cases, too, the swelling remitted completely within 8–18 days and the lameness subsided. Based on the good results we had within a short period of time we would like to apply the VIBROSTATIC heat bandage frequently in future general and clinical practice."

Example II

"For some weeks I have had the newly developed VIBROSTATIC bandages in different sizes and of different designs to test them on horses.

The following fields of application on horses are to be considered:

1. Tendinitis acuta and chronica

2. Periositis in the area of the metacarpus
3. After distortions in the area of the toe joints
4. Formation of galls and after puncture of galls to prevent recurrences
5. Swellings of the limbs after traumata, limb swellings due to stasis.

At present I have about 10 bandages on trial for the above indications.

After my first experiences I can say that the bandages are well suited for the range of extremities of the horse, both regarding their size and the type of fastening. After wearing the bandage 7-14 days, a detumescence or a remission of the inflammatory symptoms was achieved. Relapses after puncture of galls or puncture of seromas could be prevented. I consider the VIBROSTATIC bandages suitable for the above indications on the horse."

Figure 9A:
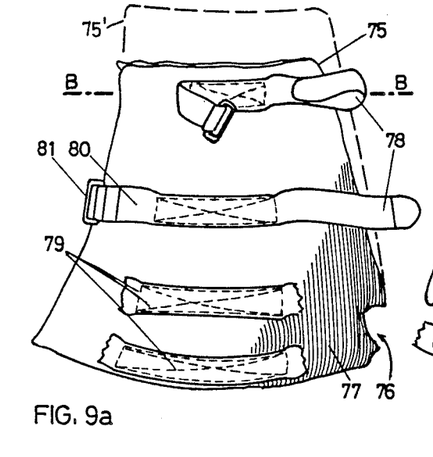
FIGS. 9a+b Top views of the outer and inner layers of a simplified, schematic drawing of a protective cover.
Figure 9B:
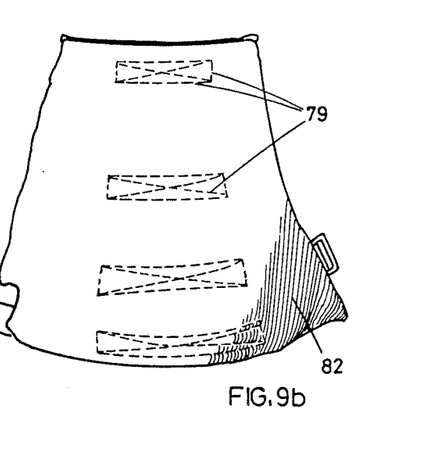
Figures 10, 11:
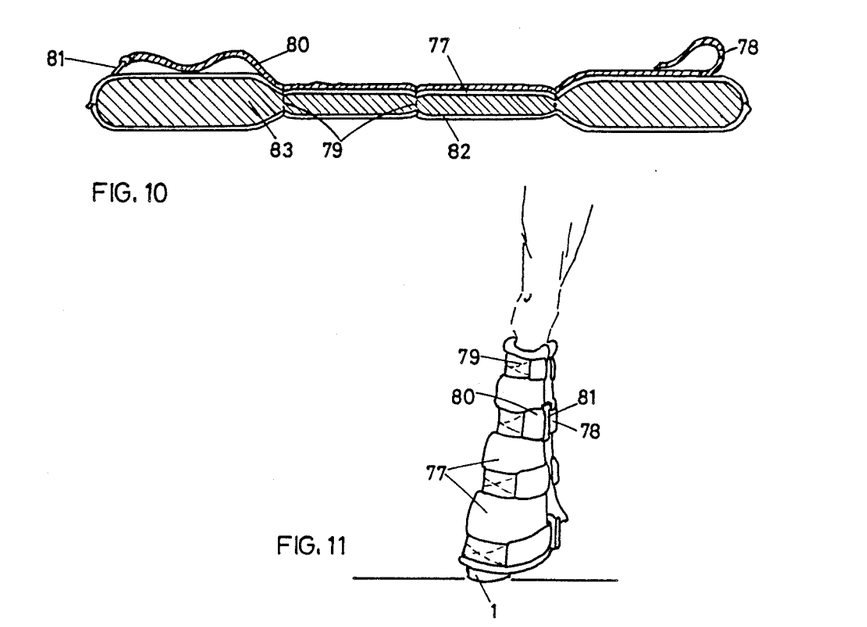
FIG. 10 a section along the level B—B of FIG. 9a through the protective cover.
FIG. 11 a schematic representation of the protective cover applied to the left foreleg, according to FIGS. 9a+b.

The protective covers for therapeutic purposes, as described above, are designed to make the healing of ailing horses possible or to speed it up. But beyond that these protective covers may, of course, also be used to prevent diseases, especially of the fore and hind legs of horses, for instance when the animals are exposed to long transports which experience shows to be a frequent source of injuries or rheumatic diseases. For the latter purpose the described protective covers are called transport bandages and they have proven their worth. A simplified version 75, 75' as compared to the foot-cover 10,10' is shown in FIGS. 9a-b and 10, and 11. The foot-cover 75 in the version shown in FIG. 9a is designed for the right foreleg and intended for covering the entire metatarsus 4, as well as the fetlock joint 3 and the pastern 2, as well as to cover the hoof almost completely, thereby completely covering the coronet 1, as shown in FIG. 11. To this effect, the lower edge of the foot-cover 75 is lengthened in its center part—as indicated in FIG. 9a—and when spread it is of a rounded shape. Then there is a cutout 76 to achieve a better fit. Since this simplified version of a foot-cover 75 does without the roll-up area used on foot-cover 10, it is convenient to shape the lateral edges in a rounded form, more or less as indicated in FIG. 9a. On the outside 77 of the foot-cover 75, adhesive and sticking tapes 78 are planned which are attached to the foot-cover 75 by sewing 79, plus the necessary fastening belts 80 which may be equipped with a buckle 81 at the front end. The inside 82 shown in FIG. 9b has no special structure, except for the seams 79 for the webbing 78,80 which are showing. The foot-cover 75 consists of an inner foam 83—as is apparent from the cross section of FIG. 10—inside of a textile fabric providing the outer layer 77 and the inner layer 82, which corresponds to the textile fabric 17, as described in detail for the foot-covers 10, 10' above. Even for these simplified versions of the foot-cover 75 it is advisable to have a double layer each of the textile fabric for the outside 77 and the inside 82, in order to increase the desired electrostatic charges by more intense friction of the layers against each other.

As compared to the foot-cover 75 for the left or right forelegs, the foot-cover 75' for the left and right hind legs is somewhat longer, as indicated in FIG. 9a. As for the rest, its make-up corresponds to the foot-cover 75.

If desired, it is of course possible to include a mechanical stiffening by way of elastic rods in this simplified transport bandage 75 or 75', too, similar to the ones described in FIG. 4a for the foot-cover 10. Also, instead of the seams 79, it is possible to plan for high-frequency welding, as described in detail above, with an appropriate foam web 83 to be used for such purpose.

The simplified protective cover 75, or 75' has proven its worth as a so-called transport bandage in practice, especially since it does not call for expert personnel to be applied, as this had been the case with wrapped bandages so far. It was also found that the undesirable constrictions and consequent circulatory distrubances cannot occur, a fact only assured for wrapped bandages if they are applied by experts. The therapeutic effects of the foot-covers of this design guarantee that even during lengthy periods of transports and in unfavourable weather, there will be no diseases of the lower extremities of the horses.

I claim:

1. A cuff-like protective cover for treating the legs of hoofed animals, particularly horses, provided with means for coupling said cover to a body part of an animal, said cover comprising:
   an inner layer;
   an outer layer, both of said layers being made of the same air-breathable knit textile fabric consisting of nonhygroscopic fibers of a synthetic material suitable for generating static electricity and having 50 to 100 stitches per square centimeter; and
   an insulating cushion comprising a sheet of air-permeable synthetic foam joined between said layers so that relative movement between the cover and the skin of the animal to which the cover is mounted will generate electrostatic charges on the skin of the animal.

2. A cover according to claim 1 characterized in that said knit fabric layers are double layers.

3. A cover according to claim 1 characterized in that the layers of textile fabric are continuous and completely enclose the cushion.

4. A cover according to claim 1 having a generally rectangular shape when spread and a length such that when coupled to a limb section of an animal, the cover extends at least from the fetlock to one of the carpal joint and talocalcanean joint, respectively, of the animal and a width such that when coupled to a limb section of an animal, the cover extends thereabout more than the circumference of the limb section, said width being subdivided into an area of contact having an outer edge coextensive with a lateral edge of said cover, and a roll-up area, with said roll-up area lying under said outer edge of said area of contact when applied whereby the resulting tube consists exclusively of textile fabric on the inside.

5. A cover according to claim 4, characterized in that the roll-up area is structured by a plurality of parallel round wads of foam having a longitudinal axis extending in the length wise direction of the cover and the means for coupling includes tape-like fasteners fixed on the outside of said cover and extends across the outer edge substantially perpendicular thereto.

6. A cover according to claim 5 characterized in that at least in some of the round wads there are elongated bars made of a resilient material, a longitudinal axis of each said bar being substantially parallel to the longitudinal axis of the respective round wad.

7. A cover according to claim 4 having a self-adhesive separating and sticking closure when said cover is applied between the inner layer along said outer edge and the outer layer along the other lateral edge, one part of said closure being fastened to said inner layer and the other part to said outer layer.

8. A cover according to claim 4 characterized in that the means for coupling is fixed on the outside of said cover and extends across the outer edge substantially prpendicular thereto and that said means for coupling constitutes one part of a separating and sticking closure, and an other part of said separating and sticking closure being secured to the outer layer in the area of contact.

9. A cover according to claim 1 having a length corresponding to the length of one of a carpal joint and a talocalcanean joint to which said cover is adapted to be mounted and a width larger than a circumference of the respective joint so as to be sized to enclose the joint when mounted thereto, a top edge longer than a lower edge, said cover being divided widthwise into an area of contact and a roll-up area, said area of contact having a bulge towards an outside lateral edge thereof with a ridge rising from said area of contact along said top edge towards the center of said area of contact, where it is flat, and then falling off again towards said lower edge.

10. A cover according to claim 1 having a substantially trapeziform shape with a rounded lower edge when spread and having a width coresponding approximately to the circumference of a section of a leg to which said cover is adapted to be applied.

11. A cover according to claim 1 further including a pocket element detachably secured on the inner side of said cover.

* * * * *